United States Patent [19]

Schmidlin

[11] 4,331,066
[45] May 25, 1982

[54] DEVICE FOR AIR CONDITIONING A CLOSED SPACE

[75] Inventor: Hans Schmidlin, Aesch, Switzerland

[73] Assignee: Eltreva AG, Aesch, Switzerland

[21] Appl. No.: 49,044

[22] Filed: Jun. 15, 1979

[51] Int. Cl.³ .................................................. E06B 7/02
[52] U.S. Cl. ........................................ 98/96; 52/304; 98/88 R; 126/429
[58] Field of Search ............... 126/428, 429, 432, 431, 126/417, 901; 98/88 R, 94, 96; 52/171, 172, 302, 303, 304, 306, 202, 788; 165/48 S

[56] References Cited

U.S. PATENT DOCUMENTS

| 2,714,816 | 8/1955 | Pennell | 52/306 |
| 3,192,575 | 7/1965 | Rosenau, Jr. et al. | 52/171 |
| 3,981,445 | 9/1976 | Custer | 98/96 X |
| 4,020,826 | 5/1977 | Mole | 126/901 X |
| 4,183,398 | 1/1980 | Ehrke | 126/429 X |

FOREIGN PATENT DOCUMENTS

| 2529932 | 1/1977 | Fed. Rep. of Germany | 52/171 |
| 2541014 | 3/1977 | Fed. Rep. of Germany | 98/96 |
| 2731685 | 1/1979 | Fed. Rep. of Germany | 126/417 |
| 2291460 | 6/1976 | France | 126/431 |

Primary Examiner—Albert J. Makay
Assistant Examiner—Harold Joyce
Attorney, Agent, or Firm—Michael J. Striker

[57] ABSTRACT

The air conditioning device for a closed space provided with a double-pane glass window comprises an air outlet channel formed between the inner and outer pane of the window, a sun drape arranged in the space opposite the inner pane. The spacing between the inner and the outer panes defining the width of the air outlet channel is reduced preferably to 40 millimeters at which value a well-defined, substantially laminar air flow takes place. The surface of the air drape facing the inner pane is profiled to reflect sun rays passing through the window at a high angle back to the window and for permitting the sun rays passing at a low angle to impinge against heat absorbing strips provided selectively on the drape.

6 Claims, 6 Drawing Figures

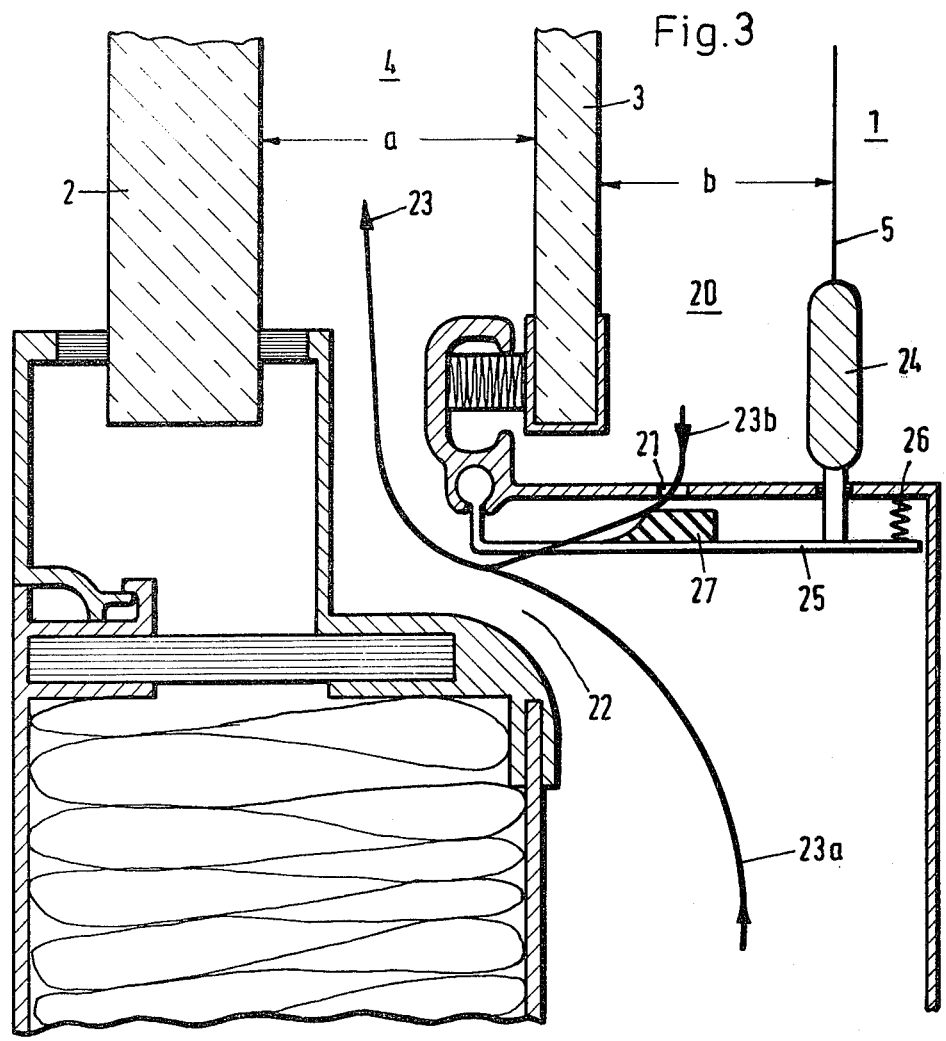
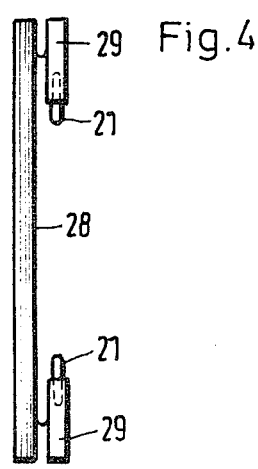

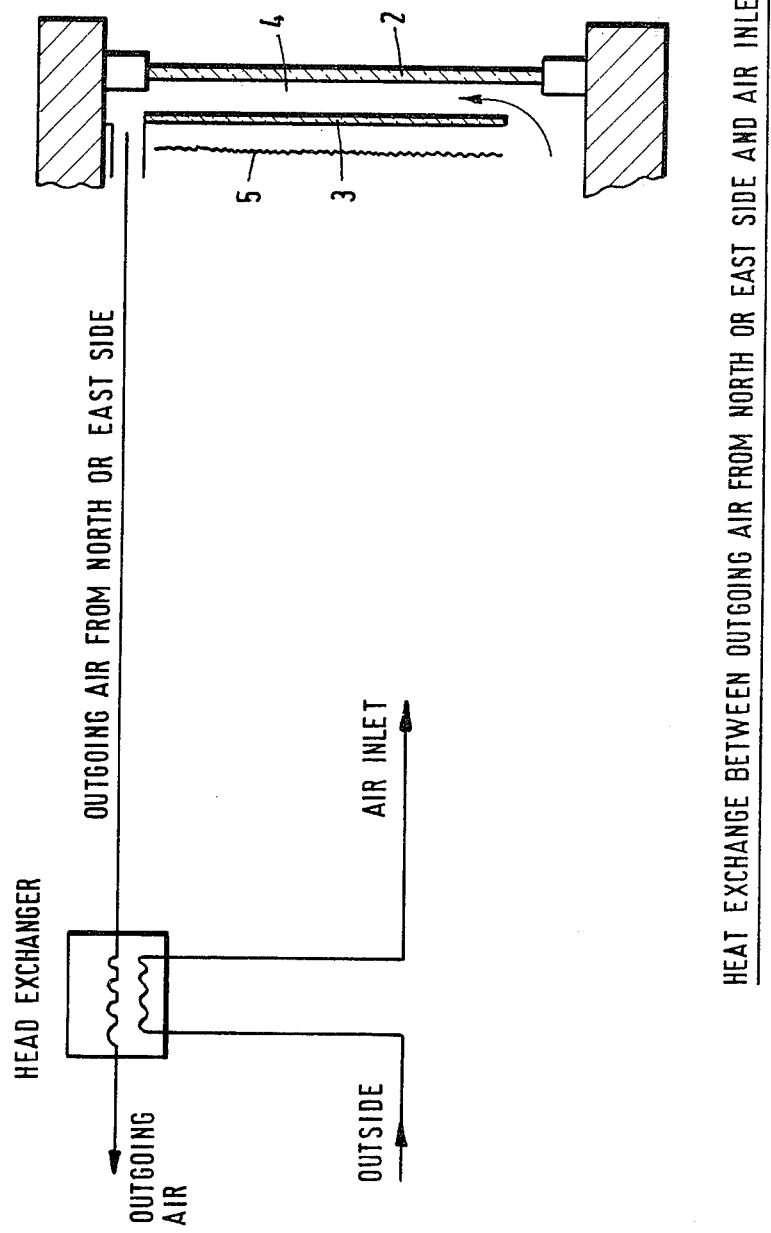

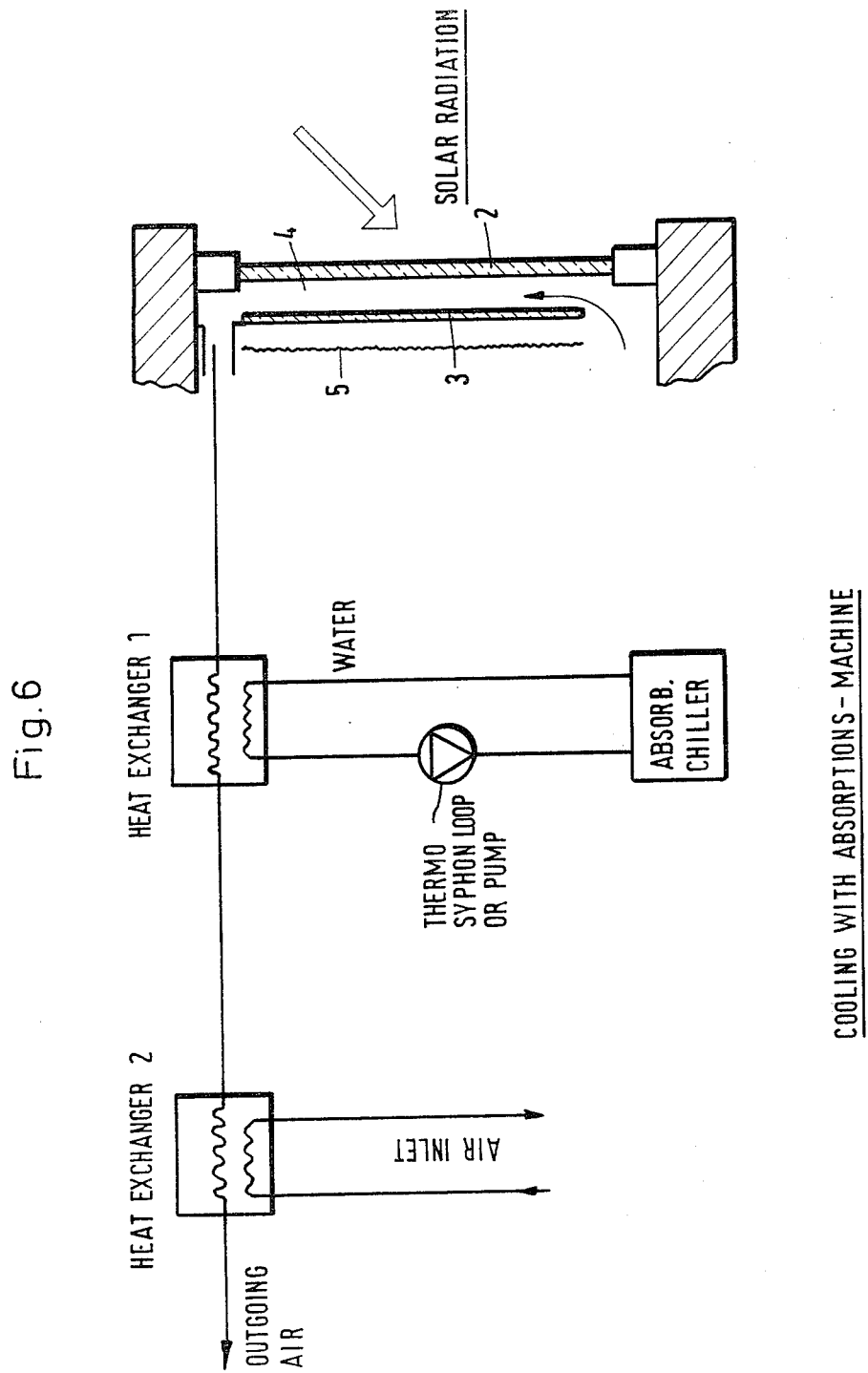

DEVICE FOR AIR CONDITIONING A CLOSED SPACE

BACKGROUND OF THE INVENTION

The invention relates generally to air conditioning devices, and more particularly it relates to a device for air conditioning a room provided with a double pane glass window and with an air outlet spaced apart from the inner pane and communicating with the outlet channel between the outer pane and the inner pane of the window, including a sun drape arranged in the room opposite the inner pane.

An air conditioning device of this type is described in the German publication DE-OS No. 23 31 332. In this prior art device, warm air from the space to be air conditioned or air from an independent air exhausting system is introduced through an array of slits into the air outlet channel in such a manner that a relatively thin film or layer of air flows from below and propagates along the inner surface of the outer pane whereas the remaining air in the outlet channel is brought into motion by the movement of the air film and forms a slightly turbulent flow along the surface of the inner pane. This arrangement is supposed to achieve a high heat insulating effect. By using a reflection glass for the outer and inner panes or a sun drape, an anti-glare effect is achieved. The clearance of the channel between the outer and inner panes in this known device as well as in the remaining prior art solutions is about 200 mm.

These known air conditioning devices possess, however, the following disadvantages:

Air supplied in a closed ventilated or air-conditioned space has to be pretreated (by warming up, drying and the like) and this pretreatment is expensive. In order to save expensive energy attempts have been made to reduce the amount of the supplied fresh air to a minimum. When taking into account different uses of the spaces to be ventilated or air conditioned, the location of these spaces and so on, there result definite values for such minimum flows of fresh air. For example, if a space to be air conditioned is used by smokers, the minimum rate of flow of fresh air per each smoker is computed to be about 42 cubic meters per hour. For a non-smoker this minimum value is only 8.5 cubic meters per hour, for example. The above exemplary values for the minimum flow rate of the fhres air determine the overall design of the air conditioning installation.

As a rule, about 50 to 100 cubic meters of air per hour and per meter of the window width are required for the necessary minimum amount of the fresh air.

For the different amounts of air to be supplied within the predetermined limits, the known air conditioning devices of this type do not achieve well-defined air flows in the relatively wide air outlet channel. In such prior-art devices the air flows into the outlet channel through slots and the like from below and due to the relatively large clearance of the channel the flow becomes turbulent in an uncontrollable manner. Inasmuch as under any circumstances the vapor condensation on the inner surface of the outer pane has to be prevented, and since such a condensation in the air outlet channel by the air flow itself cannot be avoided because of the relatively low speed of the flow in the channel and particularly due to the completely uncontrollable turbulences of the flow, experts in the art concentrated on the effort to further improve the insulating qualities of the outer pane. This solution, however, further increases the already substantial cost of such known devices.

Another disadvantage of known windows in this device is their relatively large structural depth resulting from the large spacing between the inner and outer panes. The excessive depth of the structure diminishes the utilizable inner space to be air conditioned and consequently brings about a further increase in the construction costs.

Especially in summer when an increased sun radiation takes place the known air-conditioning devices have the following further disadvantage: As known, if a sun ray beam passes through a medium, a certain portion of the ray beam is reflected from the upper surface of the medium whereas the portion of the ray beam which enters the medium is refracted and absorbed whereby the medium heats up. Only a negligible portion of the sun rays impinging on the outer pane is reflected whereas the majority of the rays enter the air outlet channel whereby as a result of absorption the outer pane as well as the air in the air outlet channel are subject to heating. The incoming sun rays are partially reflected on the outer side of the inner pane and contribute to an additional heating of the air in the outlet as well as to the heating of the outer pane. The part of sun rays passing through the inner pane are partially reflected by the sun drape and thus impinge against the outer surface of the inner pane and result anew into the heating of the latter.

For this reason a general interpretation among experts is that the provision of sun drape opposite the inner pane of the window in the space to be air conditioned results in the worst sun screening factor. As the best heat inhibiting means is considered the arrangement of the sun drape on the open air side opposite the outer pane (DE-Z "Bauen+Wohnen", copy ⅝, 1976, pages 72 and 73). Accordingly, the use of a strip-like or laminated drape between the window panes as well as in the interior of the room is explicitly not recommended due to allegedly insufficient protection against sun heat (CH-Z "Schweizerische Bauzeitung" 93rd annular publication, 1946, page 741).

SUMMARY OF THE INVENTION

It is, therefore, a general object of the present invention to overcome the aforementioned disadvantages.

More particularly, it is an object of the invention to provide an improved air-conditioning device of the above-described type which results in a substantial increase of the sun heat protection factor.

In keeping with these objects, and others which will become apparent hereafter, one feature of the invention resides, in a device for air conditioning a closed space provided with a double pane glass window and having an air outlet opening spaced apart from the inner pane and communicating with the air outlet channel between the outer pane and the inner pane, in the provision of the sun rays reflecting drape arranged in the space opposite the inner pane, and in reducing the clearance between the inner and outer panes to such a value at which a well-defined, substantially streamlined or laminar air flow takes place in the outlet channel.

It is of advantage when the distance between the inner pane and the outer pane is adjustable.

Under the term "air outlet channel" in the following description is understood the inner space of the double pane window through which the air flow takes place. The computation of the optimum clearance between the outer and inner panes of the window is made with regard to the lowest outer air temperature which can be expected in winter, or the desired relative air humidity in the room or the desired room temperature, or the available amount of air, the heat transferred between the room and the outer space, the desired upper surface temperature of the sun drape in winter, the desired or necessary amount of air supplied into the room as well as with regard to the location and orientation of the room to be air conditioned (climate of the area, orientation of the building, for example facing the south or the north and the like). The standard value for the clearance between the outer and inner glass panes has been found to be about 40 mm. In comparison with prior-art devices, the standard value represents substantial reduction of the structural depth of the device which also contributes to the corresponding cost savings.

By virtue of the considerably reduced depth of the air outlet channel there result under application of a predetermined amount of air in the latter a well-defined, substantially streamlined or laminar air flow (the turbulent boundary flow portions at the walls of the air outlet channel can be considered as negligible). Due to the streamlined laminar air flow it is achieved that a considerable reduction of energy losses in the conditioned air, particularly in winter, takes place.

The reduction of the clearance of the air outlet channel from the hitherto conventional 200 mm to a standard value in order of 40 mm, for example, is made possible due to the fact that the sun drape is not arranged in the air outlet channel but inside the conditioned room opposite the inner glass pane. This arrangement is counter to the aforementioned concept prevailing among experts, namely that sun drape is to be arranged at the outer side of the outer glass pane, or at least in the air outlet channel itself in order to prevent, particularly in summer, the undesired heating of the interior space to be air conditioned. The intentional departure from this hitherto prevailing interpretation of the application of the sun drape results, surprisingly, in many advantages. An obvious advantage results from the fact that the sun drape is not exposed to weather and, therefore, maintains its heat-emitting and light-transmitting quality.

Transparent glasses, that means non-colored glasses are employed for the panes of the double-pane window. Consequently, the necessity to use artificial light sources is held to a minimum. The sun drape in each particular case is to be designed such that always a certain portion of the visible light radiation is transmitted in order to illuminate the air conditioned space. It is essential, however, that this illumination be effected not by direct light rays, but only by means of diffused light.

By increasing the distance between the inner glass pane and the outer glass pane the speed of the air flow can be reduced and consequently an increased heat transfer to the open air side can be achieved. The adjustment of this distance between the inner and outer panes can be made also in response to the heating of the air-conditioned room resulting from the actuation of illuminating appliances.

Another surprising technological progress should be seen in the fact that the streamlined or laminar flow of the air in the channel between the panes in comparison with conventional devices of this type having a non-laminar air flow represents a substantial increase of protection against the sun radiation.

The application of the device of this invention is not limited to the air conditioning of spaces but can also be applied for the ventilation of rooms.

According to one feature of this invention, the outer glass pane is made of a single glass plate. Whereas it is conventional to use single glass plates for the inner pane of the window, the possibility to use with advantage a single glass plate for the outer pane is surprising.

In a known embodiment, the outer glass pane is normally composed of insulating glass plates. Such insulating glass assemblies consist of two or three glass plates forming narrow interspaces between each other which are hermetically sealed from all sides and are filled with dry air or gas. Sun rays impinging on these insulating glass assemblies are reflected to a minute degree only and pass through the outer pane into the air outlet channel. As it has been mentioned above, due to the absorption of the sun rays the sealed glass plate assembly as well as the air or gas cushions enclosed therebetween become heated. Sun rays passing through the insulating glass plate assembly toward the interior of the air-conditioned room impinge on the sun drape which in conventional embodiments is arranged between the outer and inner panes and the rays are partially reflected therefrom and consequently impinge again from the opposite direction on the insulating pane assembly. During the passage of the reflected sun rays through the interior glass plate of the insulating pane assembly there results again a heating effect on the latter. The heating energy in this case cannot be conducted to the outer atmosphere since the interspace filled with dry air or gas is hermetically closed and acts as a sort of an insulating cushion against this conductive heat transfer. The heat radiation of the heated glass plate facing the air outlet channel is, therefore, directed towards this channel only and consequently in the direction of the sun drape which consequently becomes still more heated. The sun drape which as explained before is additionally heated by the reflected portion of the rays transfers a part of its heat in the direction of the inner pane which is formed of a single glass plate and the latter becomes also heated and finally contributes to the heating of the air-conditioned space. It is evident, therefore, that the insulating composite glass pane which is used as the outer pane of the double-pane window in order to avoid condensation and has, therefore, a high insulating value, prevents just because of this high insulating value the conductive heat transfer to the outer-most glass plate facing the open air; moreover, it reinforces the heat transfer toward the interior space and consequently causes at least in summer an undesired heating effect on the air-conditioned space.

Suppose that in the above-described prior-art air-conditioning devices sun drape is not arranged in the air outlet channel but in the interior space opposite the inner pane of the window, then the aforedescribed disadvantages regarding the undesired heating of the space are still increased.

In the air-conditioning device of this invention a well-defined temperature profile in the outer glass pane employing a single glass plate is attained in the direction from the outer surface facing the outer air toward the inner space and consequently in connection with the increased speed of the air flow in the air outlet channel the formation of condensate on the inner side of the outer pane is reliably prevented. By this intentional deviation from the prevailing opinion, namely that the condensation is to be prevented by increasing the insulating value of the outer pane, this invention replaces the conventional composite insulating glass pane by a single glass plate which regarding the insulation quality is substantially inferior to the composite insulating glass plate assembly but despite this, it effectively prevents the condensate formation. Moreover, by forming the outer pane as a single glass plate considerable cost reductions result.

Within the bounds of this invention the novel air-conditioning device can be adjusted to different operational requirements in a most advantageous manner.

The sun drape can be made in such a way that the maximum portion of the impinging sun radiation is reflected outwardly. This configuration of the sun drape is of advantage particularly in the case when a heating of the air-conditioned space is to be prevented.

The sun drape can be designed also such that the maximum portion of the sun radiation reflected from the drape is absorbed in the window panes whereby a refrigerating machine is assigned to the air outlet channel to employ the exhaust air as its cooling medium. In this arrangement, therefore, the sun rays reflected from the drape are applied for the heating of the two glass panes and consequently a strong heating of the exhaust air flowing in the channel between the panes is achieved. The warm exhaust air serves as a working medium for the refrigerating machine which in turn can be used as a cooling installation.

In a modification, the sun drape can also be constructed in such a manner that the impinging sun rays are substantially absorbed therein and the portion of the sun rays reflected from the drape is absorbed substantially in the window pane whereby a heat exchanger for heating a separate air flow is operatively arranged in the air outlet channel. In this arrangement, the sun drape is strongly heated and contributes, therefore, to the heating of the interior space. At the same time the window panes as well as the air stream guided therebetween are heated. The warm exhaust air can subsequently be passed through a heat exchanger in order to heat up another air stream which in turn is supplied to other spaces which are not exposed to sun radiation.

During the night operation, it is possible to circulate the air in the air-conditioned space in a closed circuit which bypasses the aforementioned heat exchanger or refrigerator so that in the air outlet channel a heat transfer toward the outer pane of the window takes place.

The surface of the sun drape facing the window is with advantage profiled in such a manner so as to increase the reflection of the impinging sun rays. Alternatively, this upper surface of the sun drape can be provided selectively with heat absorbing layers or coating so that the drapes have areas of increased absorption and reduced reflection of the rays. This selected coating can be applied for example only in those areas of the drape which are exposed to sun rays impinging thereon at a low or flat angle as the case is in fall or in winter.

The aforementioned effects can be still amplified by applying radiation reflecting coatings on respective upper surfaces of the window panes.

In order to insure an optimum comfort both in summer and in winter, the surface temperature of the sun drape on the surface facing the air-conditioned space should be close to the room temperature. In winter the defined streamlined air flow in the air outlet channel between the glass panes is sufficient to maintain a temperature of about 19° C. on the inner pane provided that the room temperature is about 22° C. and the outer air temperature is about −15° C. At an increased sun radiation, however, the inner pane is heated by the rays reflected from the sun drape or by the rays absorbed in the inner pane to a temperature of about 48° C. and the facing upper surface of the sun drape reaches a temperature of approximately 32° C. The latter temperature according to a further elaboration of the present invention can be lowered approximately to the room temperature by providing the interspace between the sun drape and the inner window pane with closable air suction openings and clearance of which is adjusted in response to the position of the sun drape and/or to the temperature in this interspace. In summer, the air present in the interspace between the inner window pane and the sun drape is discharged by suction in such a manner as to transfer a maximum heat energy. In winter, however, it is desired that as little energy as possible be removed by the outer window pane from the air flow in the air outlet channel. For this reason, there is a possibility to employ the air sucked off from the interspace between the inner pane and the sun drape for heating this air flow in the outlet channel.

The control or the adjustment of the air suction openings in the interspace between the inner pane and the sun drape can be made in different ways. For example, when the sun drape is lowered to its lowermost position so the weight provided on the bottom edge of the drape can actuate a button or the like which opens via a suitable linkage the air suction openings. In a variation the weight on the sun drape can also actuate the switch of an electrical control device which opens the air suction openings. For example, in activating a motor for lowering the sun drape there can simultaneously be actuated electromagnets which control via a linkage or actuation rods the suction air openings. In still another modification, an expansion rod made, for example, of a synthetic material having a high coefficient of expansion is arranged in the interspace between the inner window pane and the sun drape opposite the air suction openings to control the cross-sectional area of these openings in response to the temperature in this interspace. Furthermore, there is a possibility to employ a temperature sensor which controls the closing of the air suction openings via a servomotor.

In addition, a refrigerating machine may be connected to the air outlet channel to cool the exhaust air. Similarly, the same function may be accomplished under suitable conditions by using cooler outside air as the refrigerating device.

The air suction openings are preferably in the form of slits located in those areas where the air is most energetic.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a sectional side view of a modification of the device of FIG. 2; and

FIG. 4 is a side view of a control device for air suction openings in the embodiment of FIG. 3.

FIG. 5 is a schematic representation, in a sectional side view, of an embodiment of this invention utilizing outside air as a refrigerating device to cool the outgoing air.

FIG. 6 is a schematic representation, in a sectional side-view, of an embodiment of this invention utilizing an absorption type refrigerating device to cool air in the air outlet channel.

DESCRIPTION OF THE PREFERRED EMBODIMENTS

Figure 1:
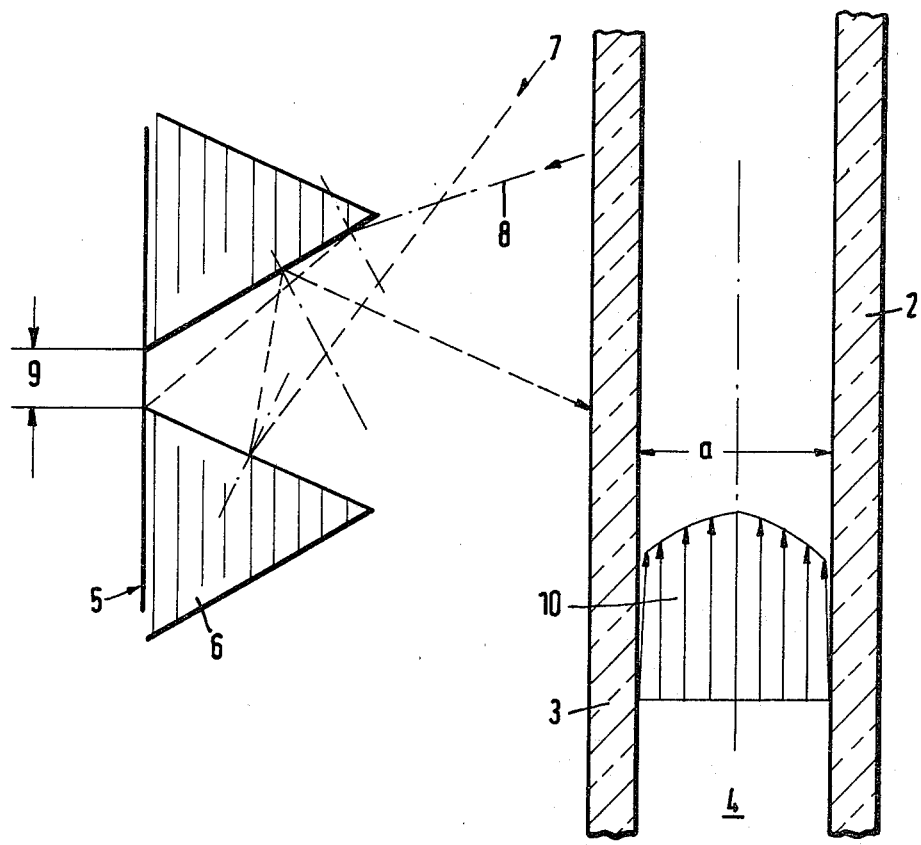
FIG. 1 is a schematic sectional side view of a cutaway portion of the air conditioning device of this invention.

Referring firstly to FIG. 1, closed space 1 to be air conditioned is provided with a double pane glass window including an outer glass pane 2 formed of a single glass plate facing the outer air and of an inner pane 3 formed also as a single glass plate facing the inner closed space 1. An air outlet channel 4 is formed between the inner and outer glass panes 3 and 2. The width of this channel 4 corresponding to the spacing between the inner and outer panes is indicated by reference character a.

A sun drape 5 is arranged in the space 1 opposite the inner pane 3. The surface of sun drape 5 facing the pane 3 is shaped into a plurality of elongated strips 6 having a triangular cross-section to reflect sun rays 7 and 8 passing through the window. The profiled elongated strips 6 extend horizontally and in vertical direction are spaced apart from one another to form strip-like flat areas 9 therebetween. The surface of this intermediate area 9 facing the window is covered with a coating having an increased absorption coefficient for the light rays and a reduced ray reflecting quality. This configuration of the sun drape 5 has the following effect:

At a high position of the sun, the sun rays 7 passing through the outer and inner panes of the window impinge on the profiled outer surface of the drape 5 at a steep angle and most of the incoming rays are reflected from the inclined side of the juxtaposed profiled strip 6 and therefrom back against the inner pane 3. The prevalent portion of the steeply impinging sun rays 7 is, therefore, returned again in the window. The vertical spacing 9 of respective profiled strips 6 as well as the width of the latter strips is selected such so as to exclude any immediate or indirect impingement of the steep sun rays 7 against the selectively coated strip-like areas 9 of the drape.

Sun rays passing through the window at a low angle when the sun is at a low position are immediately reflected against the intermediate strip-like area 9 of the drape which is selectively coated by a ray absorbing layer. As a result, an increased absorption in this intermediate area 9 takes place and consequently an increased heating of the drape 5 and this heating contributes to the air conditioning of the closed space 1.

The sun drape 5 may be made of metalized fabric and the heat absorbing coating 9 may be metal.

The clearance or spacing a between the outer pane 2 and the inner pane 3 is reduced with respect to prior-art clearance of about 200 mm in standard windows of this type to such an extent that the air flow in the air outlet channel 4 is substantially a streamlined or laminar air flow 10.

Figure 2:
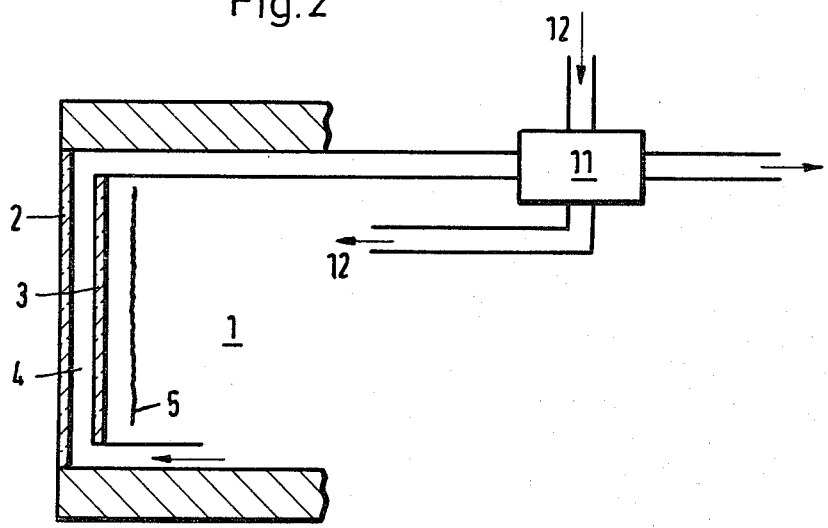
FIG. 2 is a schematic representation, in a sectional side view, of another embodiment of the air conditioning device of this invention.

The illustration of the air conditioning device of this invention in FIG. 2 is reversed about 180° about a vertical axis with respect to the embodiment in FIG. 1 so that the window is located at the left-hand side. In this embodiment, a heat exchanger 11 communicates with the air outlet channel 4 between the inner and outer panes 3 and 2 and exchanges the heat from the air flow discharged from the channel 4 to a separate air flow 12 discharged into the air conditioned space 1. This separate air stream 12 is withdrawn from another air conditioned room which is not exposed to the sun radiation.

In the embodiment according to FIG. 3, the spacing between the inner pane 3 of the window and the sun drape 5 is designated by reference character b. The interspace 20 between the inner pane 3 and the sun drape 5 is provided with closable air suction openings 21, the clearance of which is controlled in response to the position of the sun drape and/or to the temperature in the interspace 20. The air suction openings 21 communicate via an air suction conduit 22 with the air outlet channel 4. The combined air stream 23 flowing in the outlet channel 4 is thus composed of a stream portion 23a which is withdrawn from the air conditioned space 1 or from a separate air conditioning installation and of a stream portion 23b sucked in from the interspace 20. The air stream portion 23b transfers heat energy from the interspace between the inner glass pane 3 and the sun drape 5.

FIG. 3 further indicates an example for controlling the suction of the air stream 23b from the interspace 20 via the openings 21. In lowering the sun drape 5 a weight 24 secured to the lower end portion of the drape 5 abuts against a lever 25 which is normally held in its rest position by means of a spring 26. In this rest position the lever 25 closes by means of a sealing strap 27, the air suction openings 21. Upon lowering the drape 5 the lever 25 is compressed downwardly and in doing so it opens the suction openings 21.

FIG. 4 shows schematically a modified embodiment of a control device for controlling the air suction openings 21. The control device includes an expansion rod 28 made of a material having a large expansion coefficient and which is arranged in the interspace 20 between the inner pane 3 and the sun drape 5. The rod 28 supports sliding members 29 which according to the expansion of the rod 28 continuously cover or uncover the cross-section of the suction openings 21 which in this embodiment have the shape of elongated slits.

In FIG. 5 the invention is depicted with a heat exchanger which utilizes outside air to cool the outgoing air and thereby heat the incoming air which may be utilized for heating.

In FIG. 6 the invention is depicted with a refrigeration device which sends cooled water to a heat exchanger which is also connected to the air outlet channel. The air cooled in this process is then shown being sent through another heat exchanger which cools incoming air which may then be used for cooling other spaces.

It will be understood that each of the elements described above, or two or more together, may also find a useful application in other types of constructions differing from the types described above.

While the invention has been illustrated and described as embodied in an air conditioning device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for air conditioning a closed space provided with a double-pane window, comprising an air outlet channel formed between the outer pane and the inner pane of said window and communicating at one end thereof with said closed space; a sun drape arranged in said closed space opposite said inner pane, wherein the surface of said sun drape facing said inner pane has horizontally directed sun rays reflecting strips having a triangular cross-section to reflect the sun rays passing through said window at a high angle back to the latter; means for producing a substantially laminar flow of air from said closed space in said outlet channel; the interspace between said sun drape and said inner pane being provided with suction air openings and with control means for adjusting the clearance of said openings in response to a position of the sun drape relative to said inner pane; and said suction air openings communicating with said air outlet channel.

2. The device as defined in claim 1, wherein said panes are formed respectively of a single glass plate.

3. The device as defined in claim 1, wherein said strips are spaced apart from one another in vertical direction to define flat strips therebetween, said flat strips being provided with heat absorbing coating.

4. The device as defined in claim 3, wherein the spacing between said profiled horizontal strips is adjusted for intercepting sun rays impinging against said profiled strips at a low angle only.

5. The device as defined in claim 1, wherein said spacing between said inner and outer panes is about 40 millimeters.

6. The device as defined in claim 1, wherein the clearance of said interspace between said sun drape and said inner pane is between 20 and 40 millimeters.

* * * * *